United States Patent [19]

Brooks

[11] Patent Number: 4,553,883
[45] Date of Patent: Nov. 19, 1985

[54] BORING TOOL WITH FLUID FEED

[75] Inventor: Daryl G. Brooks, Sanger, Calif.

[73] Assignee: Kent-Moore Corporation, Warren, Mich.

[21] Appl. No.: 582,847

[22] Filed: Feb. 23, 1984

[51] Int. Cl.⁴ .............................................. B23B 39/10
[52] U.S. Cl. ..................................... 408/130; 408/10; 188/282; 188/317; 92/10
[58] Field of Search ................ 92/9, 10; 188/282, 317; 408/10, 11, 17, 130, 709

[56] References Cited

U.S. PATENT DOCUMENTS

| | | | |
|---|---|---|---|
| 2,152,293 | 3/1939 | Wagner | 408/130 |
| 3,331,266 | 7/1967 | Brooks | 408/130 |
| 3,519,109 | 7/1970 | Whisler, Jr. | 188/282 |
| 3,548,977 | 12/1970 | Morgan | 188/282 |
| 3,763,970 | 10/1973 | Anderson | 188/282 |

FOREIGN PATENT DOCUMENTS 2454563 12/1980 France ................................ 188/282

Primary Examiner—Gil Weidenfeld
Assistant Examiner—Daniel W. Howell
Attorney, Agent, or Firm—Beaman & Beaman

[57] ABSTRACT

The invention pertains to a boring tool for boring cylinder chambers of internal combustion engines without removing the engines from the vehicle chassis. A housing affixed to the engine block includes a rotatable driveshaft supporting a cutting tool whereby rotation of the driveshaft by an electric motor causes linear movement of the driveshaft to feed the tool. Tool advance is produced by a spiral groove pump defined upon a piston mounted on the driveshaft located within an oil-filled cylinder defined in the housing. A valved fluid passage located in the driveshaft piston selectively permits the pump to be bypassed for axial rapid traverse movement of the driveshaft and tool.

6 Claims, 7 Drawing Figures

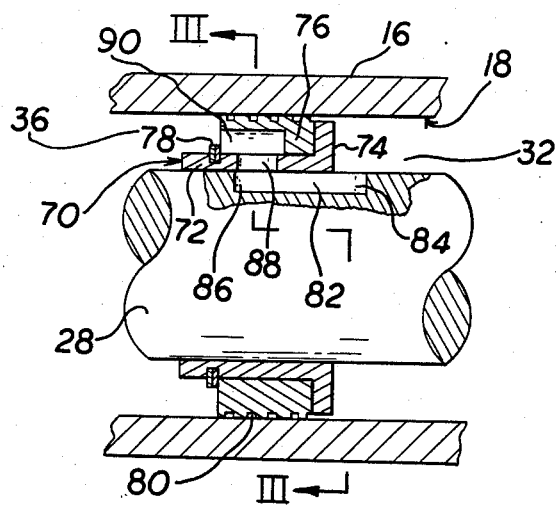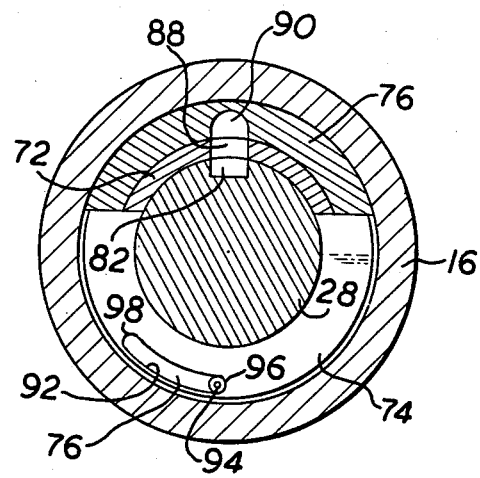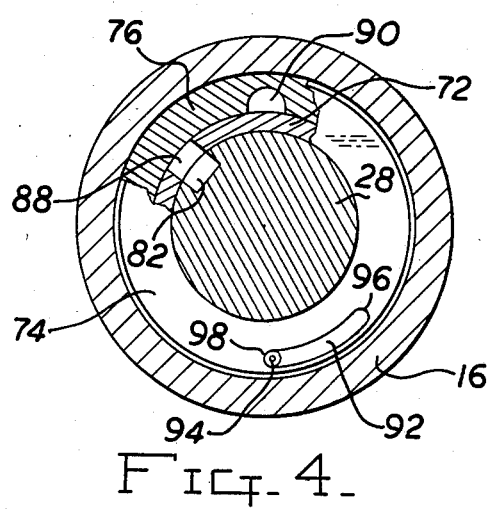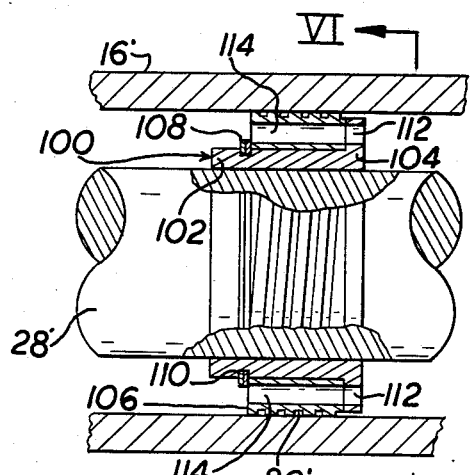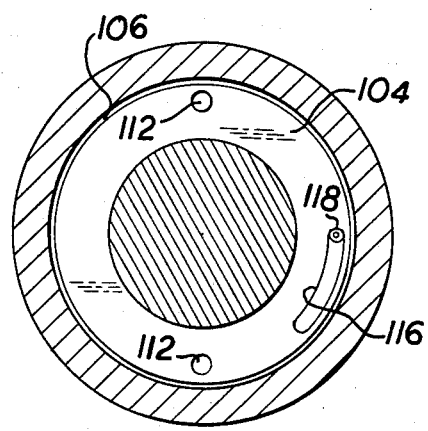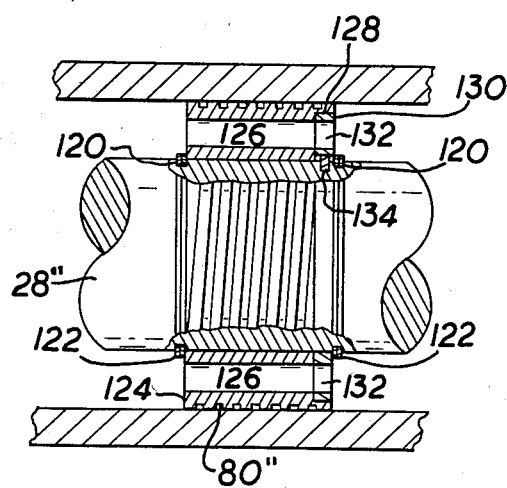

BORING TOOL WITH FLUID FEED

BACKGROUND OF THE INVENTION

The cylinders of heavy-duty internal combustion engines, such as truck engines, are often overhauled for maintenance and repair purposes. Heavy-duty gas and diesel engines usually include cylinder sleeves which are removable from the engine block, and in the regular maintenance of such engines the cylinder sleeves may be removed and the worn sleeves replaced along with replacement of the O-rings used to seal the cylinder sleeves with respect to the engine block.

When overhauling an engine it is usually required, in addition to removing and replacing the cylinder sleeves, to recondition the surface of the engine chamber walls adjacent the cylinder sleeve seal, and this reconditioning usually includes the boring out of the chamber walls concentric to the cylinder sleeve chamber. Such a boring operation may be accomplished by conventional machine tools, such as a milling machine, if the engine is removed from the vehicle. However, considerable time and expense may be eliminated if this boring operation can be accomplished while the engine remains within the vehicle, and in my U.S. Pat. No. 3,331,266 I disclose a boring tool for accomplishing this purpose.

In the boring tool shown in U.S. Pat. No. 3,331,266 a housing is mounted upon an engine block having a portion concentric to an engine cylinder sleeve chamber, and a rotatable driveshaft is supported upon the housing having a cutting tool attached thereto whereby rotation and axial displacement of the tool will accomplish the desired chamber wall reconditioning. Rotation of the driveshaft is by an electric drill associated with a chain and sprocket drive connection for rotating the driveshaft, and axial movement of the driveshaft and tool during the cutting operation is accomplished by hydraulic pump structure.

The pump structure includes a piston fixed upon the driveshaft and the driveshaft-piston moves within a cylinder within the housing. The cylinder is filled with hydraulic oil, and a circumferential spiral groove defined in the piston periphery functions as a pump to transfer fluid from one side of the piston to the other during driveshaft rotation. This pumping or transfer of the fluid imparts a linear movement to the driveshaft prducing the tool feed.

For rapid traverse of the driveshaft and tool, a fluid passage bypass system exists within the driveshaft controlled by a manually operated valve wherein fluid is readily transferred across the piston upon the opening of the valve. The valve is manually actuated by a control handle extending axially through the driveshaft structure.

In my U.S. Pat. No. 3,331,266 considerable machining of the driveshaft is required to produce the bypass passages and the valve structure requires extensive machining and a plurality of components requiring assembly, including a compression spring. In the event of spring breakage the tool may advance too rapidly with attendant damage to the tool or the engine block.

It is an object of the invention to provide a boring tool of the aforedescribed type wherein the fluid bypass about the driveshaft piston is simplified without adversely affecting the operating characteristics of the tool and economies in manufacture and assembly are experienced.

Another object of the invention is to provide a boring tool of the aforedescribed type wherein valve structure is incorporated in the driveshaft piston, and the valve structure is operated by rotation of the driveshaft, and does not require complex manual actuation apparatus.

In the practice of the invention a boring tool of the aforedescribed type utilizes piston structure comprising a two-part assembly wherein a portion of the piston is fixed to the tool supporting driveshaft, and another portion of the piston is capable of limited rotational movement to the first piston portion. Fluid passages within the two piston portions constitute valve structure wherein alignment of the passages at one rotational orientation of the piston portions permits fluid flow through the piston, while misalignment of the piston portion passages prevents such bypass flow during rotation of the driveshaft in a tool cutting direction.

The degree of relative rotation between the piston portions is limited by rotation limiting means consisting of a pin within a slot. Engagement of the pin with one end of the slot aligns the piston passage portions to open the bypass passages, while engagement of the pin with the other end of the slot constitutes the passage closed condition. An external accessible handle permits manual rotation of the driveshaft to position the piston portion passages to control the rapid traverse bypass operation.

BRIEF DESCRIPTION OF THE DRAWINGS

The aforementioned objects and advantages of the invention will be appreciated from the following description and accompanying drawings wherein:

FIG. 2 is an elevational, detail, sectional, enlarged view of the driveshaft and piston structure, FIG. 3 is an elevational, sectional view taken along Section III—III of FIG. 2 illustrating the piston portions' passages in an aligned condition, FIG. 4 is an elevational, sectional view similar to that of FIG. 3 illustrating the piston portions' passages in a misaligned condition, FIG. 5 is an enlarged, detail, elevational, partially sectioned view of the driveshaft with another embodiment of piston construction defined thereon, FIG. 6 is a transverse elevational, sectional view of the embodiment of FIG. 5 taken along Section VI—VI thereof, and FIG. 7 is an enlarged elevational, partially sectioned, detail view of the driveshaft with yet another embodiment of piston structure mounted thereon.

DESCRIPTION OF THE PREFERRED EMBODIMENTS

Figure 1:
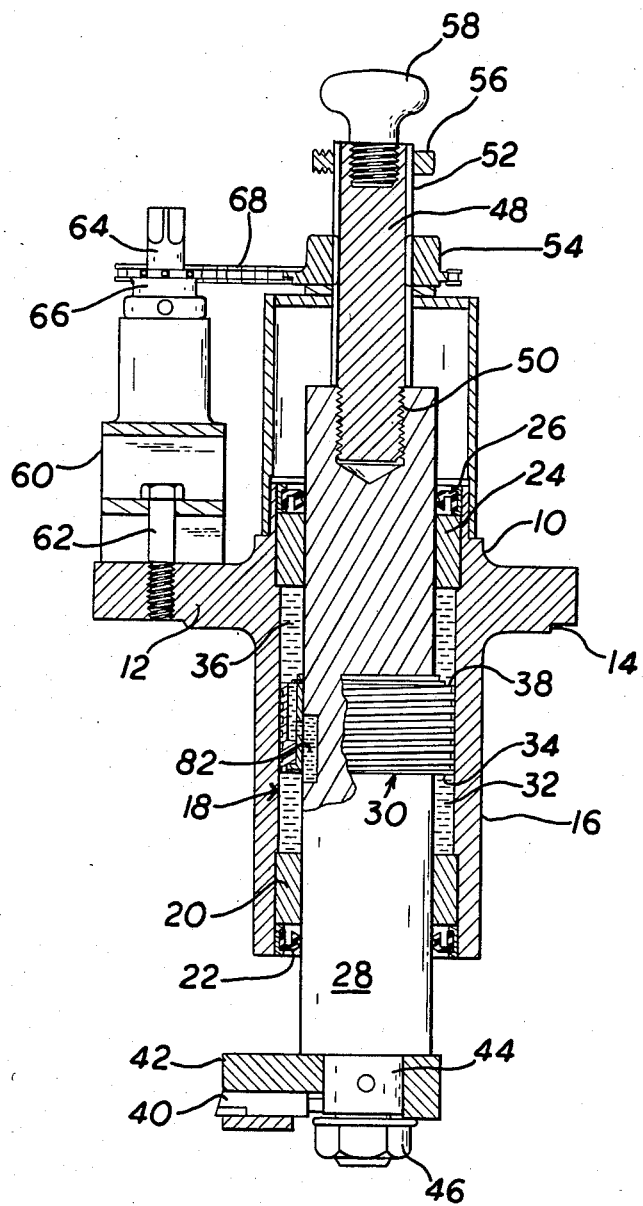
FIG. 1 is an elevational, sectional view of a boring tool in accord with the invention.

Many of the components of the invention are identical to those shown in my U.S. Pat. No. 3,331,266, and reference to this patent will aid in understanding the environment in which the tool is used, and will also permit an understanding of the mode of tool use except for differences arising from the rapid traverse operation.

The housing 10 is of a generally elongated configuration and includes a mounting flange 12 having a cylindrical land 14 defined thereon whereby the housing may be mounted upon an engine block and reception of the land 14 within a cylinder chamber axially aligns the elongated cylindrical portion 16 of the housing with the engine cylinder axis. The housing portion 16 is provided with an internal concentric bore which defines a cylinder 18, the lower end of which is closed by the bushing 20 and seal 22 while the upper end of the cylinder is sealed by the bushing 24 and seal 26.

A tool driveshaft 28 is mounted within the cylinder 18 and is of such length to extend through the bushings 20 and 24. The seals 22 and 26 seal the driveshaft with respect to the cylinder, and the driveshaft is capable of axial displacement relative to the housing and cylinder. Piston structure generally indicated at 30 is mounted upon the driveshaft and divides the cylinder 18 into a lower portion 32 adjacent the piston forward face 34, and an upper cylinder portion 36 adjacent the piston rear face 38.

At its lower end, the driveshaft 28 supports a cutting tool 40 mounted within the radial tool bar 42 fixed on driveshaft stud 44 by a nut 46. In this manner the tool bar and tool may be removably attached to the lower end of the driveshaft for tool replacement, and the tool bar and tool will move as a unit with the driveshaft.

At its upper end, an extension 48 is coaxially threaded into the driveshaft at 50, and the extension includes a plurality of axially extending splines 52 supporting the chain sprocket 54 having internal splines mating therewith wherein the sprocket 54 and extension 48 are keyed together for rotational movement, but capable of relative axial displacement.

A stop collar 56 may be attached to the uppermost end of the extension 48, and a manually operated knob 58 is threaded into the extension end permitting manual rotation of the extension and driveshaft 28 to control the rapid traverse operation, as described below.

A pedestal 60 is mounted upon a portion of the housing flange 12 by bolt 62, and the pedestal includes a vertically extending stub shaft 64 rotatably mounted within the pedestal having an upper end which may have a square or hex transverse configuration for attachment to electric motor drive structure, such as the chuck of a ½" electric hand drill. The small pinion sprocket 66 is attached to the stub shaft for rotation therewith, and chain 68 interconnects the sprockets 54 and 66 whereby rotation of the stub shaft by its drive means will rotate the driveshaft 28.

The preferred piston 30 is illustrated in detail in FIGS. 2-4. This piston structure includes an inner piston portion 70 having a cylindrical sleeve section 72 and a radially disposed flange 74. The piston portion 70 is fixed upon the driveshaft 28 by welding, a press fit, or the like.

The outer piston portion 76 is of an annular configuration and is rotatably mounted upon the outer cylindrical surface of the inner section 72. The portion 76 is axially located upon the portion 70 by engagement with the flange 74, and with the snap ring 78 received within a groove defined in the section 72. The outer circular periphery of the portion 76 substantially engages the housing cylinder 18, and is provided with one or more spiral grooves 80 which helically circumvent the circumference and intersect the forward and rear faces 34 and 38 of the piston portion 76.

The driveshaft 28 is provided with an axially extending passage 82 which intersects the shaft surface throughout its length. As will be appreciated in FIG. 2, the passage 82 includes an end 84 which extends "forwardly" of the piston flange 74, and the other end 86 of the passage is in alignment with a radial port 88 defined in the inner piston sleeve 72.

The piston portion 76 is provided with an axially extending passage 90 communicating with the piston rear face 38, and also intersects the inner cylindrical surface of the piston portion 76. Thus, when the port 88 and passage 90 are in radial alignment an axial fluid flow path is defined between the forward and rear piston faces as apparent in FIGS. 2 and 3.

Relative rotational movement between the piston portions 70 and 76 is limited by a circular arc slot 92 defined in the flange 74 receiving an axially extending pin 94 mounted in the piston portion 76. When the pin 94 engages the slot end 96 the piston passage 90 will be in radial alignment with the port 88, FIG. 3. However, when the piston portions 70 and 76 have been rotatably displaced relative to each other, the passage 90 will be out of radial alignment with the port 88 terminating fluid flow through the piston, and at its extreme location as shown in FIG. 4 the pin 94 will engage the slot end 98.

Rotation of the driveshaft 28 by manually rotating knob 58 will rotate the piston portions 70 and 76 relative to each other between the positions shown in FIGS. 3 and 4. This rotation occurs due to the greater frictional resistance to rotation between the piston portion 76 and the cylinder 18 than exists between the piston portion 70 and the piston portion 76, and it is only necessary to rotate the driveshaft 28 a few degrees to align or misalign the piston passage 90 with the port 88 to control fluid flow through the piston 30 permitting or preventing rapid traverse of the axial displacement of the driveshaft and tool.

In use, the housing 10 is mounted upon an engine block in the manner described in my U.S. Pat. No. 3,331,266. The electric motor drive means, such as an electric hand drill, not shown, is attached to the stub shaft 64, and the driveshaft 28 is manually rotated in a clockwise direction to achieve the relationship shown in FIG. 3 wherein the passage 90 and port 88 are aligned. Thereupon, the driveshaft may be pulled to its "uppermost" position by knob 58 wherein the piston 30 engages the bushing 24. During this rapid traverse retraction of the tool the hydraulic fluid will flow from the cylinder portion 36 through the piston into the cylinder portion 32.

Once fully retracted the driveshaft is manually rotated in a counterclockwise position to the position shown in FIG. 4 preventing bypass of the fluid through the piston 30, and the electric motor is energized to rotate the driveshaft 28 to initiate the boring operation. As the driveshaft is rotated fluid will move through the spiral grooves 80 from the cylinder portion 32 to the cylinder portion 36 causing axial displacement of the driveshaft to axially feed the driveshaft and tool 40 into the surfaces to be machined. Once the piston 30 engages the bushing 20 the machining will be terminated, the driveshaft may be manually rotated to the position of FIG. 3, and the driveshaft and tool rapidly traversed to its fully retracted position, ready for installation in another engine block cylinder chamber.

It is to be appreciated that during the cutting operation the direction of rotation of the driveshaft 28 is such as to frictionally maintain the piston portions orientation as shown in FIG. 4 wherein the flow of bypass fluid through the piston is prevented. Accordingly, inadvertent opening of the bypass passage is prevented due to the nature of the operation of the tool and malfunctioning of the rapid traverse system is not possible as is the case with my previous boring tool which utilized a spring to maintain the valve structure in a closed condition.

Another embodiment of piston apparatus is shown in FIGS. 5-6. In this embodiment the driveshaft 28' requires no machining, and the internal annular piston portion 100 is fixed to the driveshaft by a press fit, welding, or the like. The portion 100 includes the cylindrical sleeve 102 having a radially extending flange 104. The annular piston portion 106 is rotatably mounted upon the portion 100, and retained between the flange 104 and snap ring 108 received in groove 110. Spiral passage 80' are defined upon the circumference of the portion 106 in the aforedescribed manner.

A pair of axially extending ports 112 are defined in the flange 104, and a pair of axially extending passages 114 are defined in the piston portion 106, as will be appreciated from FIG. 5. A passage 114 and a port 112 will axially align to define a pair of flow passages through the piston to permit rapid traverse adjustment of the driveshaft 28', and relative rotational movement of the piston portions 100 and 106 is controlled by the slot 116 defined in the flange 104 in which the pin 118 mounted within portion 106 is received. Upon the pin 118 engaging one end of the slot 116 a port 112 and passage 114 are aligned, and upon engagement of the pin with the other slot end the passages and ports are misaligned closing the flow passage through the piston during the cutting operation. Of course, the slot and pin orientation is such that rotation of the driveshaft during cutting maintains the flow passage closed.

Another embodiment of piston structure is shown in FIG. 7 wherein the driveshaft 28'' includes grooves 120 receiving snap rings 122 between which the annular piston portion 124 is rotatably located. Piston portion 124 includes the circumferential spiral grooves 80'' and a pair of axial flow passages 126 are defined therein similar to the passage 114 of the embodiment of FIG. 5.

The forward end of the piston portion 124 is recessed at 128 to receive the port ring 130 in which a pair of axially extending ports 132 are defined for selective alignment with the passage 126. The ring 130 is keyed to the driveshaft 28'' at 134 for rotation with the driveshaft, and a slot and pin arrangement is defined in the ring 130 and portion 124 in a manner identical to that of the embodiment of FIGS. 5 and 6 to limit relative rotation between the ring 130 and piston portion 124. Operation of this embodiment is identical to the previously described piston structure variations.

It is appreciated that various modifications to the inventive concepts may be apparent to those skilled in the art without departing from the spirit and scope of the invention.

I claim:

1. In a boring tool for boring out cylinders in engine blocks wherein the tool comprises a housing having a cylindrical bore therethrough, a driveshaft mounted in said housing bore in axial alignment therewith and simultaneously movable with respect to said housing in rotation about and linearly along the axis of said bore, rotary drive means drivingly interconnected with said driveshaft for rotation thereof, mounting means on said housing for mounting said housing on the cylinder of an engine block, a cutting tool mounted upon said driveshaft exteriorly of said housing for machining an engine block cylinder, and linear drive means mounted on said driveshaft for driving said driveshaft linearly along said bore, said linear drive means including a piston mounted on said driveshaft for rotation therewith having a periphery engaging said housing bore and having a spiral groove defined therein, a forward face, and a rear face and a fluid within said bore whereby rotation of said piston transfers fluid from the piston forward face to the piston rear face translating said driveshaft, the improvement comprising, a passage defined in the piston for establishing selective fluid communication between the piston forward and rear faces, a valve means defined in the piston within said passage controlling fluid flow through said passage positionable between open and closed positions, a valve actuator defined on the driveshaft operative to shift said valve means between said open and closed positions, the piston comprising an annular peripheral portion defining the piston periphery and an annular valve portion defining said valve means, said peripheral and valve portions being relatively rotatable about the driveshaft axis and each having a passage defined therein forming, at least, a portion of said piston passage, relative rotational movement of said peripheral and valve portions due to rotation of said driveshaft by said valve actuator aligning and misaligning said passages thereof to produce said open and closed positions, and relative rotation limiting means interposed between said piston peripheral and valve portions limiting relative rotation therebetween.

2. In a boring tool as in claim 1, said rotation limiting means having a first rotational position constituting said valve means open position and an opposite rotational direction second rotational position constituting said valve means closed position.

3. In a boring tool as in claim 2, said piston valve portion being fixed to said driveshaft and said piston peripheral portion being rotatably supported upon said valve portion.

4. In a boring tool as in claim 3, said valve portion passage being radially oriented relative to the driveshaft, an axial passage defined in said driveshaft in radial alignment with and communicating with said valve portion passage and communicating with said piston forward face.

5. In a boring tool as in claim 3, said valve portion having a radial flange section, said valve portion passage being axially oriented and defined in said radial flange section.

6. In a boring tool as in claim 2, said piston valve portion comprising a ring fixed to said driveshaft, said valve portion passage axially extending therethrough.

* * * * *